United States Patent [19]
Sepulveda et al.

[11] Patent Number: 4,568,657
[45] Date of Patent: Feb. 4, 1986

[54] CATALYST FORMED OF NATURAL CLAY FOR USE IN THE HYDRODEMETALLIZATION AND HYDROCONVERSION OF HEAVY CRUDES AND RESIDUES AND METHOD OF PREPARATION OF SAME

[75] Inventors: Gonzalo Sepulveda; Marcos Rosa-Brussin; Nereida Carrion; Pedro Roa; Alfredo Morales Ruiz; Jose Guitian; Otto Rodriguez; Carlos Zerpa, all of Caracas, Venezuela

[73] Assignees: Intevep, S.A.; Universidad Central de Venezuela, both of Caracas, Venezuela

[21] Appl. No.: 657,150

[22] Filed: Oct. 3, 1984

[51] Int. Cl.$^4$ .......................... B01J 29/00; B01J 29/06
[52] U.S. Cl. ........................................ 502/81; 502/83; 502/84; 208/111; 208/217
[58] Field of Search .............................. 502/81, 83, 84

[56] References Cited

U.S. PATENT DOCUMENTS

| | | | |
|---|---|---|---|
| 1,796,107 | 3/1931 | Jonas et al. | 502/83 X |
| 2,388,735 | 11/1945 | Gary et al. | 502/81 X |
| 3,617,215 | 11/1971 | Sugohai et al. | 502/81 X |
| 3,824,191 | 7/1974 | Wey et al. | 502/81 X |
| 3,876,523 | 4/1975 | Rosinski et al. | 208/89 |
| 3,901,826 | 8/1975 | Hofstadt et al. | 502/83 |
| 3,977,961 | 8/1976 | Hamner | 502/185 X |
| 3,989,645 | 11/1976 | Long et al. | 502/303 |
| 3,993,601 | 11/1976 | Long et al. | 502/303 |
| 4,299,730 | 11/1981 | Sommer et al. | 502/81 X |

FOREIGN PATENT DOCUMENTS

| | | | |
|---|---|---|---|
| 52-39590 | 3/1977 | Japan | 502/84 |
| 57-102233 | 6/1982 | Japan | 502/84 |

Primary Examiner—D. E. Gantz
Assistant Examiner—William G. Wright
Attorney, Agent, or Firm—Bachman & LaPointe

[57] ABSTRACT

A natural active stable catalyst for use in the hydrodemetallization (HDM) and the hydroconversion (HC) of heavy crudes and residues and, in particular, a method for the preparation of the catalyst from natural clay and a process for the treatment of heavy crudes and residues with the catalyst. The catalyst is free of hydrogenating metals of Groups VIB and VIII of the Periodic Table and comprises primarily iron, silica and alumina derived from the composition of the natural clay. The catalyst possesses a surface area of between 20 to 100 m$^2$/g, a total pore volume of between 0.20 to 0.90 cc/g, where 50 to 100% of the total pore volume contains pores of diameter greater than 400 Å. The catalyst has a ratio I(Fe)/I(Si+Al) of between 0.2 to 0.9 as determined by XPS.

21 Claims, 4 Drawing Figures

CATALYST FORMED OF NATURAL CLAY FOR USE IN THE HYDRODEMETALLIZATION AND HYDROCONVERSION OF HEAVY CRUDES AND RESIDUES AND METHOD OF PREPARATION OF SAME

BACKGROUND OF THE INVENTION

The present invention relates to a catalyst for use in the hydrodemetallization (HDM) and the hydroconversion (HC) of heavy crudes and residues and, more particularly, a method for the preparation of the catalyst from natural clay and a process for the treatment of heavy crudes and residues with the catalyst.

The use of catalysts for the hydrodemetallization and the hydroconversion of hydrocarbons of petroleum origin has been known for some time. Known processes are suitable for the reduction of the high metal content, the high asphaltene and Conradson carbon content, the high viscosity and the high sulfur and nitrogen contents of heavy crudes and residues. In addition, these processes are important since they facilitate an increase in yield of liquid fractions which are of greater commercial value.

High metallic contents in crudes and residues are very harmful in other petroleum refining processes, such as hydrocracking, hydrodesulfurization and catalytic cracking, since it poisons the catalysts, while the asphaltenes cause blocking of the catalyst bed thereby reducing its useful life, thus increasing the costs of operation.

Various types of catalysts have been utilized to eliminate metals and asphaltenes contained in heavy crudes and residues. U.S. Pat. Nos. 2,687,985 and 2,769,758 disclose a natural catalyst of the bauxite type. U.S. Pat. No. 2,730,487 teaches the use of a catalyst in which titania is supported on alumina. U.S. Pat. No. 2,771,401 discloses a catalyst formed from artificial or synthetic clays and silica-alumina materials.

U.S. Pat. No. 3,838,042 discloses a catalyst which consists of 0.5% nickel, 1% cobalt and 8% molybdenum, supported on an inorganic polymer obtained by cogelation of an aqueous solution of $SiO_2$ and $Fe_3$ and calcination of the gel.

German Pat. No. 2,112,529 teaches a catalyst consisting of a matrix of clay which contains $\geq 20$ wt.% of $Al_2O_3$, as a surface area of 10 m$^2$/g, and a pore volume of 0.2 cm$^3$/g.

U.S. Pat. No. 3,553,106 utilizes a catalyst of vanadium oxide supported on activated alumina. U.S. Pat. No. 4,075,125 employs as a demetallization catalyst a red mud mixed with $Al_2O_3$ (10 wt.%).

German Pat. No. 2,824,765 teaches removing metals and asphaltenes from heavy crude by employing a hydrogenation catalyst which contains magnesium silicate and metals of Group VA, VIA or VIII of the Periodic Table. In addition, catalysts have been described which have one or more metals of Group VIB and Group VIII supported on alumina, which has large pores and a high surface area, able to demetallize heavy crudes, such as U.S. Pat. Nos. 3,876,523, 3,977,961, 3,989,645 and 3,993,601, respectively.

There are a number of disadvantages associated with the known prior art catalysts as set forth above. Many of the catalysts contain large quantities of expensive metals and, therefore, are very costly. The catalysts obtained from natural materials such as bauxite, red med, magnesium silicate, etc. do not specify the degree of dispersion of the metal in the natural material. Finally, all of the above catalysts are employed under extremely severe conditions of pressure and temperature in order to obtain improvement in heavy crudes and residues.

Naturally, it would be highly desirable to provide a catalyst for the hydrodemetallization and hydroconversion of heavy crudes and residues which does not employ the expensive hydrogenating metals.

Accordingly, it is the principal object of the present invention to provide an improved catalyst for use in the hydrodemetallization and hydroconversion of heavy crudes and residues.

It is a particular object of the present invention to provide an improved catalyst for use in the hydrodemetallization and hydroconversion of heavy crudes and residues characterized by improved catalytic activities such as hydrodemetallization and the conversion of asphaltenes and Conradson carbon.

It is a further object of the present invention to provide a method for the preparation from natural clay of a catalyst used in the hydrotreatment of heavy crudes and residues.

It is a still further object of the present invention to provide a process for the treatment of heavy crudes and residues with a catalyst prepared from natural clay.

Further objects and advantages will appear hereinbelow.

SUMMARY OF THE INVENTION

In accordance with the present invention the foregoing objects and advantages are readily obtained.

The present invention relates to an active natural stable catalyst for use in the hydrodemetallization and the hydroconversion of heavy crudes and residues and, in particular, a method for the preparation of the catalyst from natural clays and a process for the treatment of heavy crudes and residues with the catalyst.

The catalyst of the present invention is based on natural clay and comprises iron highly dispersed on a silica-alumina material of perfectly defined chemical composition and structure, which impart to the catalyst excellent catalytic properties without the necessity of adding to it expensive hydrogenating metals such as the metals of Groups VIB and VIII of the Periodic Table. The ratio of iron, which is highly dispersed on the surface of the natural catalyst, to aluminum and silicon gives values, when measured by XPS of $I(Fe)/I(Si+Al)$ of between 0.2 to 0.9, preferably 0.3 to 0.8 and is responsible for the improved catalytic activity. The catalyst possesses a surface area of between 20 to 100 m$^2$/g, preferably 30 to 90 m$^2$/g, a total pore volume of between 0.20 to 0.90 cc/g, preferably 0.30 to 0.80 cc/g where 50 to 100% of the total pore volume, preferably 55 to 95%, contains pores of diameter greater than 400 Å. The natural clay employed in the present invention has the following composition: 3.0 to 10.0 wt.% $Fe_2O_3$, 40 to 75 wt.% $SiO_2$, 10 to 25 wt.% $Al_2O_3$, 0.1 to 0.8 wt.% $MgO$, 0.3 to 2.6 wt.% $K_2O$ and 0.5 to 1.5 wt.% $Na_2O$.

The novel characteristic possessed by the catalyst of the present invention gives it advantages over the prior art catalysts, since it permits, in the same process, the elimination of metals, reduction of asphaltene content, conversion of the 950° F.+ residuum or the heavier fractions from vacuum distillation into fractions of greater commercial value, and reduction of the viscosity and the Conradson carbon content of crudes and residues.

In order to prepare a catalyst having the dispersion of iron and catalytic characteristics as set forth above, it is necessary to carry out a process for the treatment of the natural clay, which consists of grinding the clay after it has been mined, carrying out a process of acid lixiviation, washing, drying, mixing with a pore-forming subtance, extrusion and calcination. The foregoing process confers on the catalyst its special physical and chemical properties which make it useful in the processing of heavy crudes and residues.

A further objective of the present invention resides in a process for the hydrodemetallization and the hydroconversion of heavy crudes and residues which consists of placing the heavy crudes and residues in a reaction zone, under specific operating conditions in the presence of hydrogen with the catalyst of the present invention. The operating conditions consist of a temperature of between 350° and 450° C., a hydrogen pressure of between 1000 and 3000 psig; a liquid hourly space velocity, LHSV, of between 0.2 and 2 volumes of heavy hydrocarbon or residue per hour per volume of catalyst and a hydrogen flow rate of between 1000 and 10,000 standard cubic feet of hydrogen per barrel of hydrocarbon (SCFB).

DETAILED DESCRIPTION

The present invention resides in a new natural catalyst based on clay for the hydrodemetallization and hydroconversion of heavy crudes and residues. The new catalysts can treat heavy charges with metal contents greater than 1000 parts per million of vanadium, nickel and iron and concentrations up to as high as 25% of asphaltenes.

Figure 1:
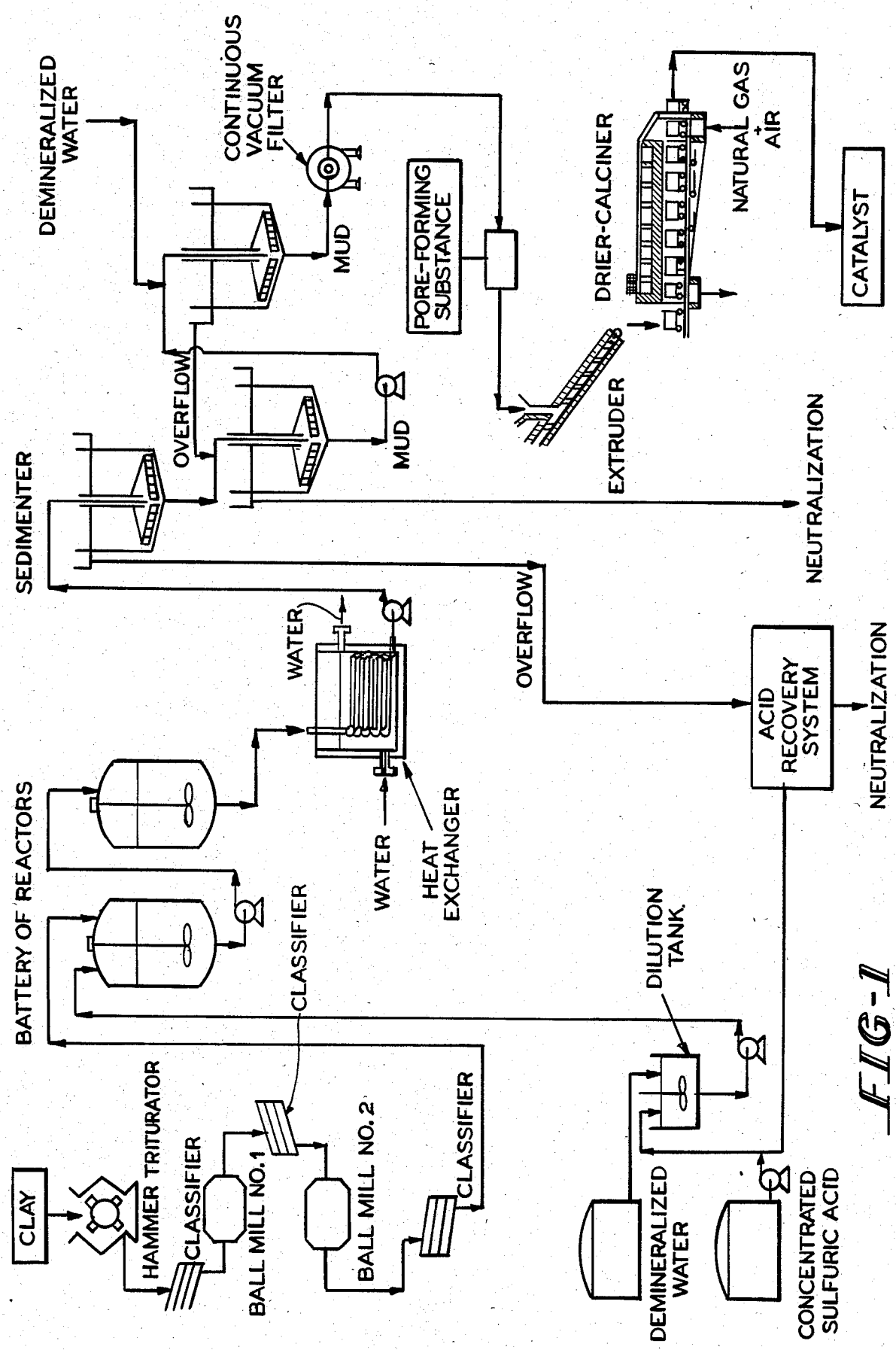
FIG. 1 is a schematic flow diagram illustrating the steps for manufacturing the catalyst of the present invention from natural clay.

The natural clay employed to obtain the catalyst of the present invention is a material having a defined crystallographic structure and possesses the following chemical composition: 3.0 to 10.0 wt.% $Fe_2O_3$, 40 to 75 wt.% $SiO_2$, 10 to 25 wt.% $Al_2O_3$, 0.1 to 0.8 wt.% $MgO$, 0.3 to 2.6 wt.% $K_2O$ and 0.5 to 1.5 wt.% $Na_2O$. The structure of the clay is set forth in *Clay Mineralogy*, Chapter 3, Page 31 by Ralph E. Grim, Published by McGraw-Hill, 1968. With reference to FIG. 1, to prepare the catalyst of the present invention the natural clay, after being mined, is triturated and milled to a particle size of between 20 and 400 mesh, preferably between 40 and 325 mesh, and then passed directly to a pilot reactor of 50 liter total charge capacity in which an acid lixiviation process is carried out. The lixiviation process consists of treating the clay with acid, which can be selected from inorganic acids including sulfuric acid, nitric acid, hydrochloric acid, hydrofluoric acid, or any organic acid, including tartaric, citric and oxalic at a temperature comprised between 70° C. and 140° C., preferably a temperature between 80° C. and 120° C., and a velocity of agitation between 100-500 revolutions per minute, preferably 150-300 revolutions per minute, for a treatment time which varies between 20 and 180 minutes, preferably between 30 and 90 minutes. The ratio of acid volume/clay mass is between 4 to 10 liters/kg, preferably between 5 to 8 liters/kg of clay. By this process of acid lixiviation, the original clay is modified in its chemical composition and its textural properties.

After the acid lixiviation process, the treated clay is washed with water by means of a charging operation, using between 20-200, preferably between 30 and 100, liters of water per kilogram of clay until the clay obtains a neutral pH. The neutral clay is then partially dried by filtration in order to obtain a paste with a water content of between 20-40 wt.% so as to obtain the plasticity necessary for the extrusion process. The moist, treated clay is then mixed with a pore-forming substance selected from carbon, wood powder, polyethylene glycol, starch, cellulose, methylcellulose, hydroxyethyl cellulose, melamine or any other substance able to produce the optimum pore volume in the final catalyst, in a quantity of 5 to 40 wt.% of pore-forming material with respect to the weight of dry clay, preferably a quantity between 8-30 wt.% of pore-forming substance. The material is then extruded. After extrusion, the extruded material is calcined in an air circulation furnace at a temperature comprised between 300° and 800° C., preferably between 400° and 700° C., for a time comprised between 1 hour and 8 hours, preferably between 2.5 hours and 6 hours, utilizing a hot air flow comprised between 4 and 20 cubic meters of air per hour per kilogram of catalyst, preferably between 5 and 10 cubic meters per hour per kilogram of catalyst.

The catalyst of the present invention has the following physical and chemical properties. The surface area is between 20 to 100 $m^2/g$, preferably between 30 and 90 $m^2/g$; the total pore volume is between 0.2 and 0.9 cc/g, preferably between 0.3 and 0.8 cc/g; 50 to 100% of the total pore volume contains pores of diameter greater than 400 Angstrom, preferably between 55 and 95% of the total pore volume contains pores of diameter greater than 400 Angstrom. The catalyst can be manufactured in the form of extrudates of a size of between 1/32 and ⅛ inch, in spheres or tablets of variable size, preferably in the form of extrudates of size of between 1/32 and 1/16 inch in diameter and between 1 and 3 millimeters in length.

The catalyst comprises from between 2 and 10% by weight, calculated as $Fe_2O_3$ and based on the total weight of the catalyst, preferably between 3.0 and 8.0% by weight, calculated as oxide and based on the total weight of the catalyst; it possesses a silica content of between 40 and 80% by weight, as $SiO_2$; preferably between 45 and 70% by weight, as $SiO_2$ and based on the total weight of the catalyst. It possesses an alumina content of between 8 and 25% by weight, as $Al_2O_3$ and based on the total weight of the catalyst, preferably a content between 9 and 20% by weight, as $Al_2O_3$ and based on the total weight of the catalyst.

Besides the preferred physical and chemical properties set forth above, the catalyst gives XPS (X-ray photoelectric spectroscopy) signals; this technique consists of exciting the atoms of any material with X-rays and measuring the energy spectrum of the electrons emitted by photoemission. The investigations were carried out with an A.E.I. ES-200B apparatus, which consists of an X-ray source, an energy analyzer, and a detection system. The apparatus was equipped with an aluminum cathode (hV=1487 eV, 300 W). $C_{1s}$ (285 ev) and $Al_{2}p$ (74.8 ev) were taken as references for calculating the bond energies. The intensities of the peaks were referred to the total area of the iron peak ($Fe_2p\frac{1}{2}-3/2$), with respect to the total area of the aluminum ($Al_2p$) and silicon ($Si_2p$) bands respectively.

The signals of surface iron, aluminum and silicon obtained by the XPS method gave a ratio $I(Fe_2p\frac{1}{2}-3/2)/I(Si_2p+Al_2p)$ comprised between 0.2 and 0.9, preferably between 0.3 and 0.8 in order to obtain the maximum hydrodemetallization capacity of the catalysts.

An advantage of the catalyst of the present invention over known prior art catalysts is its low cost since it does not contain supported hydrogenating metals of Groups VI and VIII of the Periodic Table, but rather the highly dispersed iron contained by the material in the natural form. It has been found that only under the above-mentioned processing conditions is it possible to obtain a catalyst based on clay which demetallizes, reduces the asphaltene content, and is able in the same process to convert heavy fractions of vacuum distillation and 950° F.+ residuum into distillable products of greater commercial value.

In order to determine the effectiveness of the present catalyst of the present invention for hydrodemetallizing and hydroconverting heavy crudes and residues, charges have been used which contain high quantities of metals, such as vanadium and nickel, and high quantities of asphaltenes. In the case of this invention, charges of heavy Venezuelan crudes from the Orinoco Oil Zone were used. These heavy crudes are subjected to hydrodemetallization and hydroconversion using the catalyst of the present invention, in a fixed bed reactor of internal diameter 3.81 cm, the catalyst charge of which had a bed length of 46.3 cm. The preferred processing conditions are as follows: The catalyst was subjected to hydrogen stream reduction and to presulfurization under strictly controlled conditions so as not to destroy the dispersion of the iron, at a temperature of between 300° C. and 500° C., preferably between 350° C. and 450° C. for 1 hour at a hydrogen pressure of between 500 psig and 3,500 psig, preferably between 1,000 psig and 2,500 psig, using a presulfurizing mixture selected from $H_2S/H_2$ or $CS_2$/gas oil, preferably $CS_2$/gas oil mixture in a ratio of 4 to 10% by weight $CS_2$ to 90 to 99% by weight of gasoil. After this process, the catalyst was placed in contact with the hydrocarbon charge at a temperature between 360° C. to 425° C., preferably between 370° C. to 420° C., in the presence of hydrogen at a pressure between 1,000 to 2,500 psig. The charge/catalyst ratio is between 0.1 to 10 volumes per volumes per hour, with a hydrogen circulation velocity of 1,000 to 10,000 standard cubic feet per barrel of feed (SCF/B). The catalyst can be used either in a conventional fixed bed reactor or in a fluidized bed.

The effectiveness of the present invention is illustrated by the following examples.

EXAMPLE I

Three catalysts were prepared from the natural clay desribed above and used for comparative trials. Catalyst I was prepared by grinding and milling the clay to a particle size between 40 and 140 mesh, washing, partially drying to obtain the necessary plasticity for the extrusion process and then mixing the clay with 15 wt.% carbon as a pore-forming substance. The material was then extruded to a size of 1/32", dried and calcined at 500° C. for 5 hours. In contrast to the process of the present invention, the milled clay was not subject to acid lixiviation prior to mixing with the pore-forming substance and thus acted as a control for demonstrating the effectiveness of catalysts made by the process of the present invention.

Catayst II was prepared by grinding and milling the clay to a particle size between 40 and 170 mesh. The material was then subject to acid lixiviation wherein 6 liters of $H_2SO_4$, 1.2N per kilogram of clay was mixed in a reactor with the clay at a temperature of 100° C. at a velocity of agitation of 200 rpm for a treatment time of 40 minutes. The material was then mixed with a pore-forming substance, extruded, dried and calcined as set forth above with regard to catalyst I.

Catalyst III was prepared by grinding and milling the clay to a particle size between 140 and 350 mesh. The material was then subject to acid lixiviation wherein 5 liters of $H_2SO_4$, 1.2N per kilogram of clay was mixed in a reaction with the clay at the same temperature and agitation velocity set forth above for catalyst II. The treatment time was 20 minutes. The material was then processed in the same manner as set forth above for catalysts I and II.

The physical and chemical properties of the catalysts are set forth below in Table I.

TABLE I

| PHYSICAL AND CHEMICAL PROPERTIES | | | |
|---|---|---|---|
| | I | II | III |
| $SiO_2$ (wt. %) | 53.55 | 54.6 | 63.3 |
| $Al_2O_3$ (wt. %) | 17.26 | 14.7 | 17.1 |
| $Fe_2O_3$ (wt. %) | 9.69 | 6.12 | 3.34 |
| $MgO + K_2O + Na_2O$ (wt. %) | rest | rest | rest |
| B.E.T. AREA ($m^2/g$) | 34 | 58 | 52 |
| PORE VOLUME (cc/g) | 0.44 | 0.49 | 0.84 |
| PORE DIAMETER (Å) | 517 | 338 | 642 |
| ACTUAL DENSITY (g/cc) | 3.06 | 2.86 | 2.86 |
| APPARENT DENSITY (g/cc) | 1.30 | 1.20 | 0.86 |
| BED STRENGTH ($Kg/cm^2$) | 6.71 | 6.2 | 5.2 |
| ACIDITY (meq $NH_3$/g) | 0.24 | 0.28 | 0.19 |
| PARTICLE SIZE (inch) | 1/32" | 1/32" | 1/32" |
| VOLUME OF PORES >1,000Å | 90 | 80 | 100 |

The tests on the catalytic activity of the aforementioned catalyst in the treatment of heavy crudes was carried out using Jobo-Morichal crude, the properties of which are summarized in Table II, below:

TABLE II

| PROPERTIES OF THE CHARGE OF JOBO-MORICHAL | |
|---|---|
| | CHARGE MORICHAL CRUDE |
| API° | 12 |
| V (ppm) | 330 |
| Ni (ppm) | 94 |
| ASPHALTENES (%) | 8.9 |
| SULFUR (%) | 2.76 |
| NITROGEN (ppm) | 5100 |
| CONRADSON CARBON (%) | 11.2 |
| VISCOSITY (cst) (140° F.) | 540 |
| $C_5$–220° C. (% V) | 2.2 |
| 220–350° C. (% V) | 20.0 |
| 350–510° C. (% V) | 22.9 |
| 510° C.+ (% V) | 54.9 |

The three catalysts were subjected to tests of initial catalytic activity under the following process conditions: T=410° C., P=1800 psig, LHSV=0.3 $h^{-1}$, $H_2$/charge ratio=1200 $Nm^3/m^3$. The running time was 60 hours.

Table III shows the initial catalytic activity of the three catalysts.

TABLE III

INITIAL CATALYTIC ACTIVITIES OF THE CATALYSTS

| | CATALYST I | CATALYST II | CATALYST III |
|---|---|---|---|
| % HDV | 51.7 | 75.0 | 66.6 |
| % HDNi | 47.0 | 51.1 | 52.1 |
| % HDM | 50.7 | 63.1 | 59.3 |
| % HDS | 25.0 | 29.0 | 16.6 |

As can be seen from Table II, catalyst I, which was not subjected to the acid lixiviation process, shows a much lower HDM and HDV catalytic activity than catalysts II and III thereby demonstrating the effectiveness of the process of the present invention for obtaining active and selective catalysts for metal elimination.

EXAMPLE II

The catalytic activity over long processing periods for the catalysts in the hydrodemetallization and hydroconversion of the crude of Table II was studied. The processing conditions were as follows: T=400° C., −410°=P=1800 psig, LHSV=0.3 $h^{-1}$, $H_2$/charge ratio=1200 $Nm^3/m^3$, running time=120 days.

The properties of the products obtained by employing the catalysts of the present invention are set forth in Table IV.

TABLE IV

PROPERTIES OF THE PRODUCTS OBTAINED WITH THE CATALYSTS OF THE PRESENT INVENTION

| | PRODUCT II | PRODUCT III |
|---|---|---|
| API° | 18 | 18 |
| V (ppm) | 106 | 110 |
| Ni (ppm) | 47 | 45 |
| ASPHALTENES (%) | 5.0 | 4.9 |
| SULFUR (%) | 1.9 | 2.3 |
| NITROGEN (ppm) | 3800 | 2400 |
| CONRADSON CARBON (%) | 8.0 | 7.3 |
| VISCOSITY (cst) (140° C.) | 29.6 | 29.1 |
| $C_5$–220° C. (% V) | 4.2 | 3.2 |
| 220–350° C. (% V) | 33.0 | 29.2 |
| 350–510° C. (% V) | 25.1 | 27.0 |
| 510° $C.^+$ (% V) | 37.7 | 40.6 |
| $H_2$ CONSUMPTION (Scf/bbl) | 331 | 420 |
| LIQUID YIELD (% V) | 103 | 102 |
| WEIGHT YIELD (%) | 98.5 | 98.5 |
| OPERATING TIME (days) | 120 | 30 |
| CATALYST CONSUMPTION (Kg/bbl) | 0.11 | — |

As can be seen from Table IV, the products obtained show a substantial decrease in vanadium and nickel content, percent asphaltenes sulfur and nitrogen, and an increase in API° gravity and a reduction in kinematic viscosity.

Figure 2:
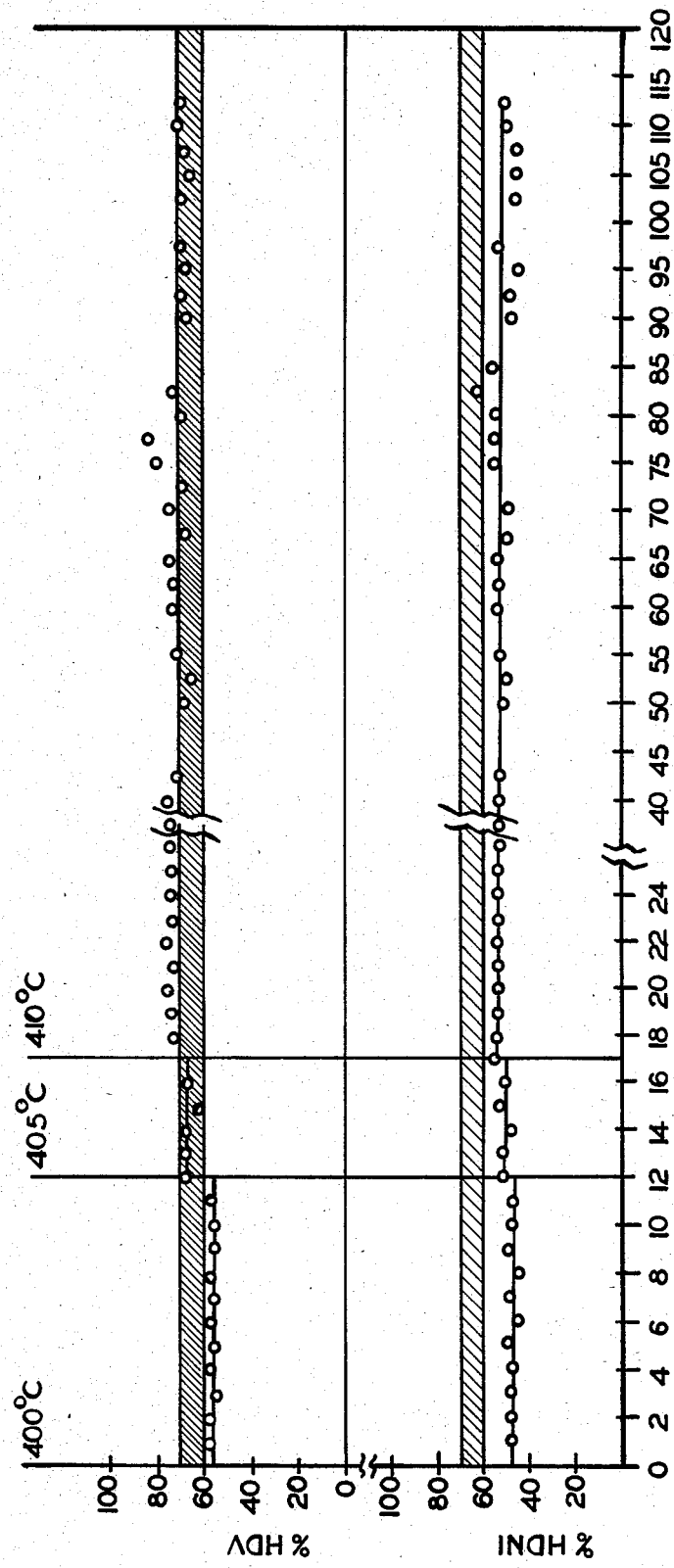
FIG. 2 is a graph illustrating the HDV and HDNI activity of the catalyst of the present invention on Jobo-Morichal Crude.
Figure 3:
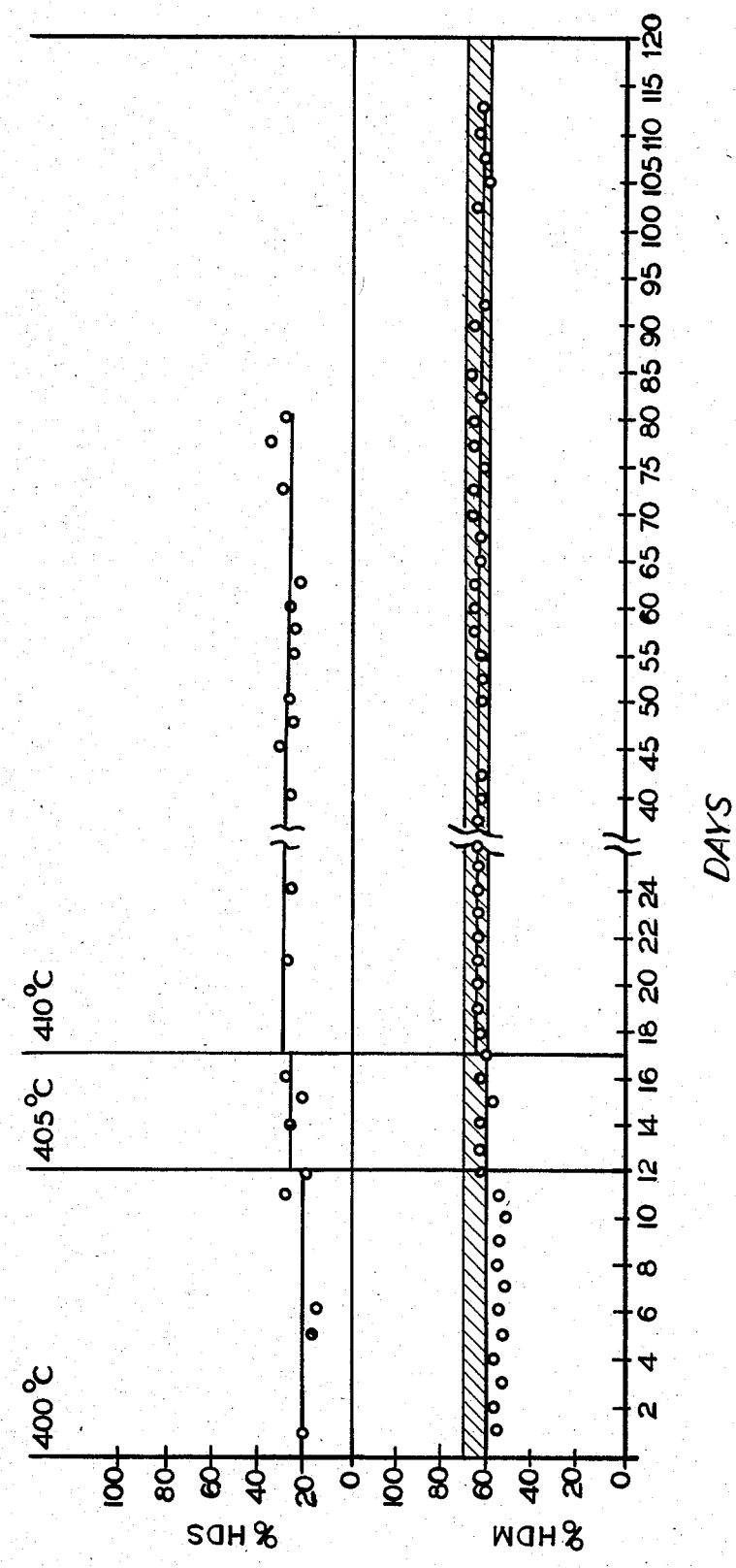
FIG. 3 is a graph illustrating the HDM(V+Ni) and HDS activity of the catalyst of the present invention on Jobo-Morichal Crude.

FIGS. 2 and 3 graphically illustrate the HDV, HDNI and HDM (V+Ni) catalytic activity for catalyst II. The catalyst shows high stability in its HDV, HDNi and HDM activity. Deactivation was not observed to appear during the 120 days of operation neither by coke formation nor by metal deposition. As noted above with regard to Table IV, the hydroconversion indicators show a behavior similar to the HDM.

EXAMPLE III

In order to show that it is the iron dispersed on the surface of the silica-alumina which confers the catalytic properties on the catalyst of the present invention, various experiments were carried out with different concentrations of sulfuric acid being used during the lixiviation step with the object of effecting a more effective extraction of the iron in the original clay. The quantity of surface iron was then measured using the XPS technique and tests of initial activity of the catalysts were carried out using the same operating conditions and the same charge of heavy crude as shown in Example I. It should be mentioned that directly after the process of acid lixiviation the clay was washed, partially dried, mixed with 15% by weight of pore-forming substance, extruded, and finally calcined according to the same procedures as in Example I.

Table V shows the results obtained for the quantity of iron exposed on the surface of the clay, represented by the parameter I(Fe)/I(Al+Si), as a function of the HDM activity of the catalyst.

TABLE V

INFLUENCE OF SURFACE IRON CONTENT OF THE CATALYSTS ON THEIR HYDROGENATING CAPACITY

| CATALYSTS + TREATMENT | % TOTAL $Fe_2O_3$ | $I(Fe_2p\frac{1}{2}-3/2)$ / $I(Si_2p + Al_2p)$ | % HDM |
|---|---|---|---|
| II (EXAMPLE II) | 6.12 | 0.47 | 65.0 |
| II $H_2SO_4$ 2N (FOR 40 min) | 5.3 | 0.35 | 50.8 |
| II $H_2SO_4$ 4N (FOR 20 min) | 3.2 | 0.20 | 45.3 |
| II $H_2SO_4$ 6N (FOR 20 min) | 2.1 | 0.15 | 40.3 |
| III (EXAMPLE II) | 3.3 | 0.45 | 68.4 |
| $SiO_2$—$Al_2O_3$ CONTROL | 0 | 0 | 12.3 |

Figure 4:
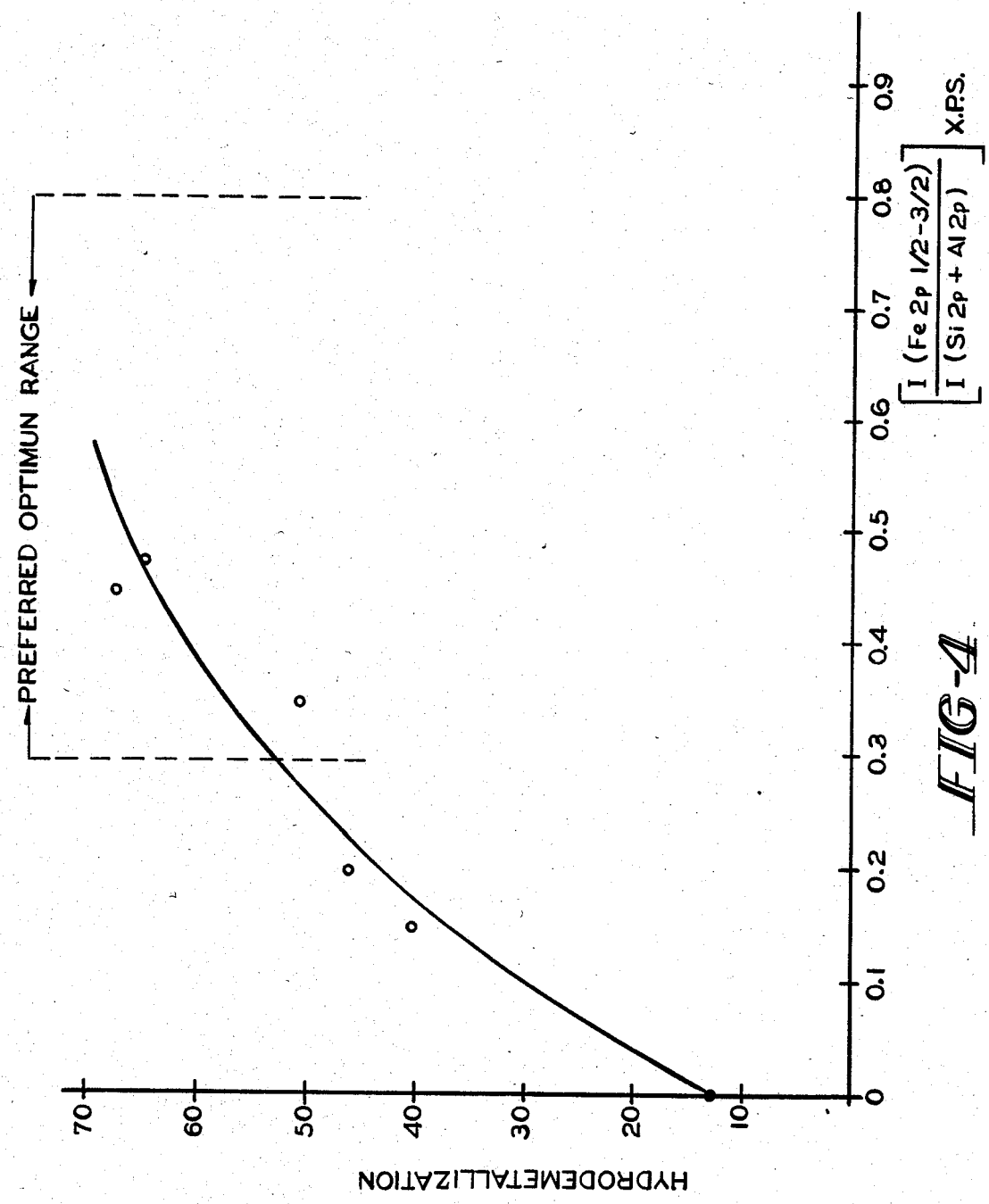
FIG. 4 is a graph illustrating the influence of surface iron of the catalyst of the present invention.

The example explained here clearly demonstrates that it is the iron exposed on the surface, and not the total iron, which is responsible for the hydrogenating activity of the catalysts. The control is a silica-alumina which has 78% of silica as $SiO_2$ and 22% of alumina as $Al_2O_3$, with the object of maintaining the ratio $SiO_2$/$Al_2O_3$ equal to 5.4, similar to that which the catalysts of the present invention have. It can be seen in FIG. 4 how, on varying the ratio I(Fe)/I(Si+Al), the hydrometallizing capacity of the catalysts increases. Thus, a ratio range comprised: I($Fe_2p\frac{1}{2}$, 3/2)/I($Si_2p+Al_2p$) from 0.3 to 0.9 is the preferred range to obtain the maximum hydrodemetallization capacity of the catalysts of the present invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for producing a catalyst from natural clay for use in the hydrodemetallization and hydroconversion of heavy crudes wherein the iron surface composition of the catalyst as measured by XPS techniques is in a ratio of from about I(Fe)/I(Si+Al) of between 0.2 to 0.9 comprising the steps of:
   providing a natural clay having the following composition based on total dry weight: $Fe_2O_3$ 3.0 to 10.0 wt.%, $SiO_2$ 40 to 75 wt.%, $Al_2O_3$ 10 to 25 wt.%, MgO 0.1 to 0.8 wt.%, $K_2O$ 0.3 to 2.6 wt.% and $Na_2O$ 0.1 to 1.5 wt.%;

triturating and milling said natural clay to a particle size of between 20 and 400 mesh;

treating said milled and sized clay in an acid bath at a temperature of between 70° to 140° C. for between 20 to 180 minutes so as to modify the chemical composition and texture properties of said clay;

washing said treated clay with water;

partially drying said washed clay so as to reduce the water content thereof to between 20 to 40 wt.% thereby obtaining the necessary plasticity for extrusion of the clay;

mixing said partially hydrated clay with between 5 to 40 wt.% of a pore-forming substance;

extruding said clay with the pore-forming substance so as to form an extrudate; and drying and calcining said extrudate at a temperature of between 300° to 800° C. for from 1 to 8 hours so as to produce a catalyst having a chemical composition comprising 2 to 10 wt.% $Fe_2O_3$, 40 to 80 wt.% $SiO_2$ and 8 to 25 wt.% $Al_2O_3$ and an iron surface composition measured by XPS techniques is in a ratio of from about I(Fe)/I(Si+Al) of between 0.2 to 0.9.

2. A method according to claim 1 further including the steps of agitating said acid bath with a velocity of agitation of between 100 to 500 rpm.

3. A method according to claim 2 further including the steps of utilizing a hot air flow of between 4 to 20 cubic meters of air per hour per kilogram of catalyst during the calcining of said extrudate.

4. A method according to claim 3 wherein the volume of acid per mass of clay in said acid bath is between 4 to 20 liters per kilogram.

5. A method according to claim 4 wherein said clay is washed with between 20 to 200 liters of water per kilogram of clay.

6. A method according to claim 1 wherein the particle size is between 40 and 325 mesh.

7. A method according to claim 6 wherein said milled and sized clay is treated in an acid bath at a temperature of between 80° to 120° C. for between 30 to 90 minutes.

8. A method according to claim 7 wherein said pore-forming substance is mixed with said partially hydrated clay in the amount of between 8 to 30 wt.%.

9. A method according to claim 8 wherein said drying and calcining takes place at a temperature of between 400° to 700° C. for between 2.5 to 6 hours.

10. A method according to claim 9 including the steps of agitating said acid bath with a velocity of said agitation of from 150 to 300 rpm.

11. A method according to claim 10 further including the steps of utilizing a hot air flow of between 5 to 10 cubic meters of air per hour per kilogram of catalyst during the calcining of said extrudate.

12. A method according to claim 11 wherein the volume of acid per mass of clay in said acid bath is between 5 to 8 liters per kilogram.

13. A method according to claim 12 wherein said clay is washed with between 30 to 100 liters of water per kilogram of clay.

14. A method according to claim 1 wherein the acid in said acid bath is selected from the group consisting of organic and inorganic acids.

15. A method according to claim 14 wherein said inorganic acid is selected from the group consisting of sulfuric acid, nitric acid, hydrochloric acid, hydrofluoric acid and mixtures thereof.

16. A method according to claim 15 wherein said organic acid is selected from the group consisting of tartaric acid, citric acid, oxalic acid and mixtures thereof.

17. A method according to claim 1 wherein said pore-forming substance is selected from the group consisting of carbon, wood powder, polyethylene glycol, starch, cellulose, methylcellulose, hydroxyethyl cellulose, melamine and mixtures thereof.

18. A catalyst for use in the hydrodemetallization and hydroconversion of heavy crudes comprising a natural clay carrier having iron highly dispersed on the surface thereof, said catalyst having a surface area of between 20 to 100 $m^2/g$ and a pore volume of between 0.20 to 0.90 cc/g wherein between 50 to 100% of the total pore volume comprises pores having a diameter of greater than or equal to 400 Å wherein the chemical composition of the catalyst is from between 2 to 10% by weight $Fe_2O_3$, 40 to 80% by weight silica and 8 to 25% by weight $Al_2O_3$ and wherein the iron surface composition measured by XPS technique is in a ratio of from about I(Fe)/I(Si+Al) of between 0.2 to 0.9.

19. A catalyst according to claim 18 wherein the iron surface composition of the catalyst is present in a ratio of from about I(Fe)/I(Si+Al) of between 0.3 to 0.8 when measured by XPS technique.

20. A catalyst according to claim 18 wherein the chemical composition of the catalyst is from between 3 to 8% by weight $Fe_2O_3$, 45 to 70% by weight silica and 9 to 20% by weight $Al_2O_3$.

21. A catalyst according to claim 18 wherein the surface area is between 30 and 90 $m^2/g$ and the total pore volume is between 0.3 and 0.8 cc/g wherein between 55 and 95% of the total pore volume comprises pores having a diameter of greater than or equal to 400 Å.

* * * * *